United States Patent
Tilt, IV et al.

(10) Patent No.: US 7,734,725 B2
(45) Date of Patent: Jun. 8, 2010

(54) METHOD AND APPARATUS FOR SERVER SIDE QUEUING TO CONTROL PAGE PRESENTATION ON WEB ENABLED DEVICE

(75) Inventors: LeRoy W. Tilt, IV, Smyrna, GA (US); Matthew B. Trevathan, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 2708 days.

(21) Appl. No.: 09/823,331

(22) Filed: Mar. 30, 2001

(65) Prior Publication Data

US 2002/0194306 A1    Dec. 19, 2002

(51) Int. Cl.
G06F 15/16    (2006.01)

(52) U.S. Cl. .......................... 709/219; 709/231; 709/220; 709/224; 707/3; 705/59

(58) Field of Classification Search .................. 709/219, 709/231, 224, 220, 221; 707/3; 705/59
See application file for complete search history.

(56) References Cited

U.S. PATENT DOCUMENTS

| | | | |
|---|---|---|---|
| 5,878,233 A | 3/1999 | Schloss ................. | 395/200.55 |
| 5,928,323 A | 7/1999 | Gosling et al. ............... | 709/203 |
| 6,023,722 A | 2/2000 | Colyer ....................... | 709/201 |
| 6,070,184 A | 5/2000 | Blount et al. ............... | 709/200 |
| 6,073,124 A * | 6/2000 | Krishnan et al. .............. | 705/59 |
| 6,073,175 A | 6/2000 | Tavs et al. ................... | 709/226 |
| 6,073,177 A | 6/2000 | Hebel et al. ................. | 709/228 |
| 6,269,403 B1 * | 7/2001 | Anders ........................ | 709/231 |
| 6,353,448 B1 * | 3/2002 | Scarborough et al. ....... | 345/744 |
| 6,549,944 B1 * | 4/2003 | Weinberg et al. ........... | 709/224 |
| 6,606,620 B1 * | 8/2003 | Sundaresan et al. ............ | 707/3 |
| 6,732,101 B1 * | 5/2004 | Cook .......................... | 707/10 |
| 6,963,908 B1 * | 11/2005 | Lynch et al. ................ | 709/220 |

* cited by examiner

*Primary Examiner*—Tammy T Nguyen
(74) *Attorney, Agent, or Firm*—Saul Ewing LLP; John R. Pivnichny

(57) ABSTRACT

A method and apparatus for controlling at the server-side the order in which supplemental files referenced in an HTML page are served to a client machine requesting the page. The server queues the supplemental files in an order dictated within the HTML code itself and serves the supplemental files in the order dictated in the queue regardless of the order of which the Web browser at the client-side requests the supplemental files.

17 Claims, 4 Drawing Sheets

FIG. 1
(PRIOR ART)

This is a Web page designed to illustrate the invention disclosed and claimed in U.S. Patent Application No. 09/000,000. This text is just a bunch of nonsense that you should imagine has something to do with the images, video clip and sound clip contained in this page. Images 18 and 20 above are large, high resolution jpeg images that will each take a long time to download.

The video clip and sound clip are really big files too and would take a really long time to download. You don't see them, but trust me, they are really big also.

FIG. 2
(PRIOR ART)

This is a Web page designed to illustrate the invention disclosed and claimed in U.S. Patent Application No. 09/000,000. This text is just a bunch of nonsense that you should imagine has something to do with the images, video clip and sound clip contained in this page. Images 18 and 20 above are large, high resolution jpeg images that will each take a long time to download.

The video clip and sound clip are really big files too and would take a really long time to download. You don't see them, but trust me, they are really big also.

FIG. 3

This is a Web page designed to illustrate the invention disclosed and claimed in U.S. Patent Application No. 09/000,000. This text is just a bunch of nonsense that you should imagine has something to do with the images, video clip and sound clip contained in this page. Images 18 and 20 above are large, high resolution jpeg images that will each take a long time to download.

The video clip and sound clip are really big files too and would take a really long time to download. You don't see them, but trust me, they are really big also.

FIG. 4

METHOD AND APPARATUS FOR SERVER SIDE QUEUING TO CONTROL PAGE PRESENTATION ON WEB ENABLED DEVICE

FIELD OF THE INVENTION

The invention pertains to Web servers. More particularly, the invention pertains to software for controlling the order of serving of supplemental files that form a part of a requested Web page.

BACKGROUND OF THE INVENTION

The World Wide Web (hereinafter the Web) is a world wide network of computers that are interconnected and able to communicate with each other via the Internet. Hypertext transfer protocol (http) is the protocol used for transferring Web pages and supplemental files over the Internet. Web servers are computers that form part of the Web and whose general purpose is to provide information to other computers coupled to the Web. Those computers that are primarily used to request and receive information via the Web from Web servers are typically termed client machines or client computers.

On the Web, information is served in the form of Web pages written in HTML (HyperText Markup Language). Thus, for example, a retail Web sight operator couples to the internet via a server on which is stored a plurality of Web pages written in HTML programming language. The HTML defining a Web page defines the manner of presentation of information on the client machine. The HTML code also typically includes the textual content of the page. However, other types of content, such as images, audio, background, and multimedia are contained in separate, supplemental, files stored on the server which are referenced within the HTML code by HTML tags. For instance, images may be stored in separate files in jpeg format or gif format. Audio files may be stored in mp3, wav, wma (the Windows™ media application), or other formats.

In a common type of example, a Web retailer has a server coupled to the Web. A customer accesses the Web retailer's Web site from a desktop computer using Web browser software such as Microsoft Internet Explorer™ or Netscape Navigator™. The customer's desktop PC utilizing the Web browser software would be considered a client machine.

The Web browser running on the client machine requests a particular Web page in a manner well known to those of skill in the art. Upon receipt of the request for a particular Web page, the server serves the HTML code for that page to the client machine via the Internet.

As noted above, the HTML code for any given page is likely to contain a references to supplemental files such as image files, audio files and/or multimedia files. When the browser receives the HTML code for the page, it parses the page to find references to supplemental files and sends requests back to the server for the supplemental files referenced in the code.

Browsers typically read the HTML code in a standard left to right, top to bottom manner and send out requests for the referenced supplemental files in the order in which they are encountered while reading the page. The server receives the requests and sends the supplemental files back to the browser in the order in which the requests are received. Typically, most browsers support multiple virtual ports for receiving supplemental files. Thus, for example, a browser with support for four virtual ports can send out four requests for supplemental files and begin receiving those supplemental files simultaneously. When a supplemental file is received in full, the browser will send out another request for the next supplemental file (assuming there are five or more supplemental files) until all of the supplemental files in the page are fully received and rendered by the browser. Since some files may be smaller than others, the order in which the requests for supplemental files are sent out does not necessarily correspond to the order to which they are received in their entirety. For instance, a small file that is requested after a larger file may be completely received and rendered before the earlier larger file.

Accordingly, the content of a page is rendered in a piece meal fashion dictated primarily by the order in which the supplemental files are referenced in the HTML code as well as the size of the files.

Some supplemental files associated with a Web page may require a significant period to download, during which time the individual at the client machine may become impatient. For instance, high resolution and/or large image files, audio files, multimedia files and video files can take a large amount of time to download. During that time, the user at the client machine may become bored or impatient. Thus, it is desirable to be able to have one or more portions of the content of the page be downloaded and displayed first so that the user at the client machine will have something to occupy his or her attention while the remainder of the supplemental files download.

Therefore, it is an object of the present invention to provide an improved method and apparatus for downloading Web pages, including supplemental files.

It is another object of the present invention to provide a method and apparatus for controlling the order in which supplemental files referenced in a Web page are served to the client machine.

It is yet a further object of the present invention to provide a method and apparatus by which the server controls the order in which supplemental files referenced in a HTML page are served to the client machine.

SUMMARY OF THE INVENTION

In accordance with the method and apparatus of the present invention, the order in which supplemental files referenced in a Web page are downloaded from the server to a requesting client is specified by the designer in the HTML code of the Web page and controlled at the server-side.

In accordance with the invention, regardless of the order in which the client-side Web browser requests supplemental files referenced in a received Web page, the server serves the supplemental files in a manner dictated by the Web page designer. More particularly, each supplemental file referenced in a Web page has a sequence number associated with it. In a preferred embodiment, the sequence number may be provided as an additional attribute of the tag associated with the supplemental file. The sequence number attribute will not be understood by the browser software at the client-side and thus will generally be ignored by the browser software. However, at the server-side, when a page is requested, the server parses the page to find the sequence number attribute associated with each supplemental file. It then builds a queue of supplemental files to be served to the client machine, the supplemental files being queued in the order dictated by the sequence number.

Thereafter, regardless of the order in which the browser returns requests for supplemental files, the supplemental files will be served in the order dictated in the queue. Existing browsers already are equipped to receive and cache files and associate such cached files with files referenced in an HTML page. Accordingly, the fact that the supplemental files referenced in a Web page may be received in an order different than the order in which the browser requested them generally is of no consequence. The browser generally still will render the supplemental files upon their being fully received. Accordingly, the invention resides entirely at the server side and will work with widely available Web browsers.

DETAILED DESCRIPTION OF THE INVENTION

Figure 1:
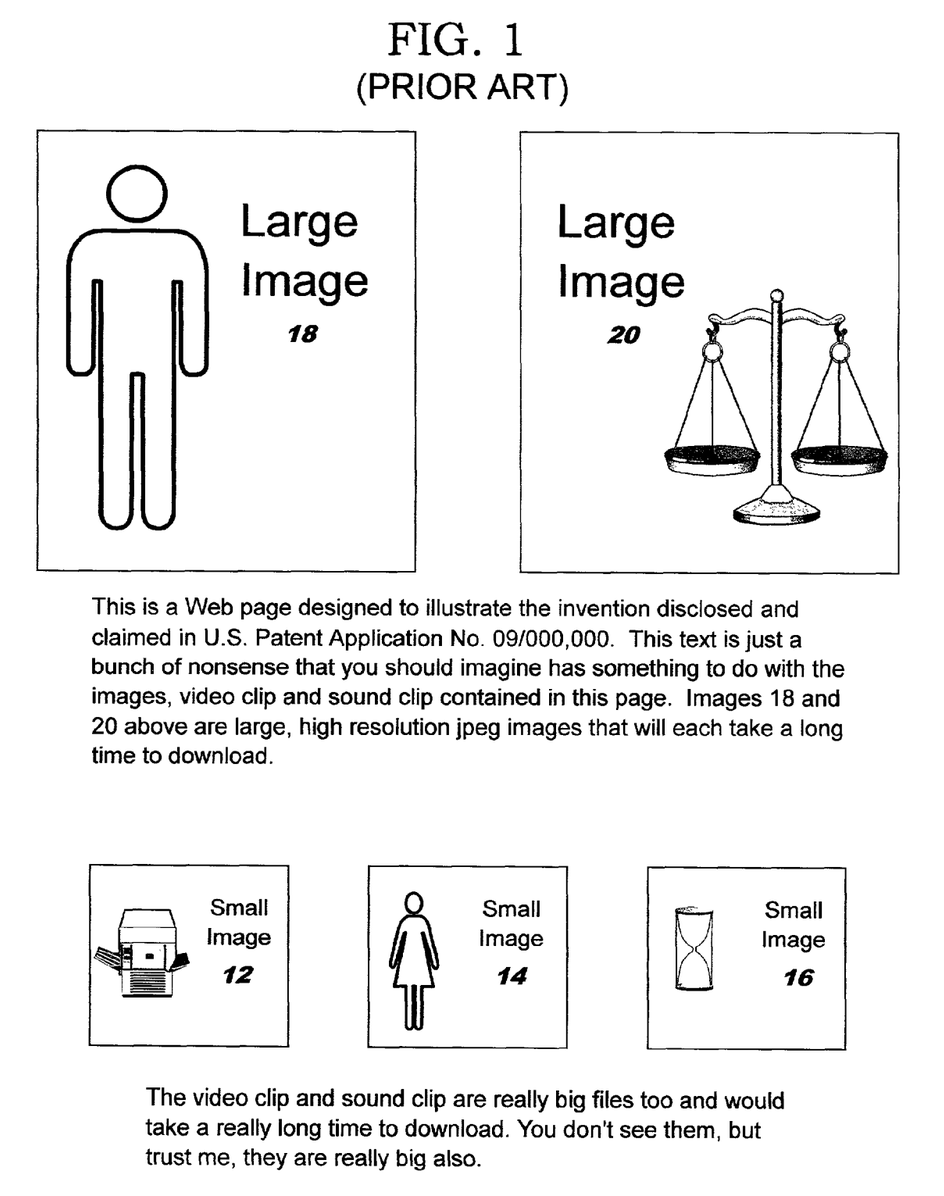
FIG. 1 is a screen capture of an exemplary, fully rendered, Web page.

FIG. 1 is a screen capture of an exemplary Web page containing a plurality of supplemental files. Table 1 shows the HTML code for the page shown in FIG. 1. The supplemental files include three thumbnail image files 12, 14 and 16 and two large, high resolution, .gif image files. It also includes an audio file that will play music while one views the page. The audio does not appear on the screen and therefore is not shown in FIG. 1. Finally, the Web page includes a video file in MPEG format that runs automatically when the page is loaded (also not shown in FIG. 1).

TABLE 1

```
<!DOCTYPE HTML PUBLIC "-//W3C//DTD HTML 4.0 Transitional//EN">
<html>
<head>
   <title>Web Page Example</title>
</head>
<body>
<div align="center">
<img src="image-18.gif" width="240" height="320" border="0" hspace="10" alt="large image 18">
<img src="image-20.gif" width="240" height="320" border="0" hspace="10" alt="large image 20">
<br>
<table border="0" width="480">
   <tr>
      <td> This is a Web page designed to illustrate the invention disclosed and claimed in U.S.
         Patent Application No. 09/000,000. This text is just a bunch of nonsense that you
         should imagine has something to do with the images, video clip and sound clip contained
         in this page. Images 18 and 20 above are large, high resolution jpeg images that will
         each take a long time to download.</td>
   </tr>
</table>
</div>
<br>
<div align="center">
<embed src="video-clip24.mpg" width="320" height="240" controller="true" border="0"
cache="false">
</div>
<br>
<div align="center">
<embed src="audio-file.mid" volume="50" height="60" width="144" hidden="true">
</div>
<div align="center">
<img src="image-12.gif" width="120" height="120" border="0" hspace="10" alt="small image 12">
<img src="image-14.gif" width="120" height="120" border="0" hspace="10" alt="small image 14">
<img src="image-16.gif" width="120" height="120" border="0" hspace="10" alt="small image 16">
<br>
<table border="0" width="400">
   <tr>
      <td>However, images 12, 14, and 16 are small thumbnail images that will download and, thus,
         be rendered much more quickly. The video clip and sound clip are really big files too
         and would take a really long time to download. You can't see them, but trust me.
         They're really big.</td>
   </tr>
</table>
</div>
</body>
</html>
```

As previously noted, in the prior art, the browser at the client-side will request the supplemental files in the order in which they are encountered as the browser software reads the code of the page. The browser software reads the HTML code generally in a left to right and top to bottom manner (the way a person would read a page of a book). Generally, browsers do not send out any requests for supplemental files until the HTML code of the page has been fully loaded at the client-side.

It can be seen from the HTML code of Table 1 that the browser will, therefore, encounter the reference to the two large .gif files first, then the MPEG file, then the audio file and then the three thumbnail image files.

If we assume that this particular Web browser can have four virtual ports open simultaneously for downloading supplemental files, then it will download the two .gif files, the MPEG file and the audio file simultaneously and will not be able to begin downloading the much smaller thumbnail image files until one or more of the first four files completes downloading. Accordingly, after a certain amount of time, for example, 10 seconds, only the first supplemental file may be fully downloaded and the user of the Web browser may see the screen shown in FIG. 2 after 10 seconds. If the thumbnails were allowed to download first, the user would at least be able to view the small, low resolution thumbnail images much more quickly while the larger images, MPEG and audio files were downloading.

Figure 2:
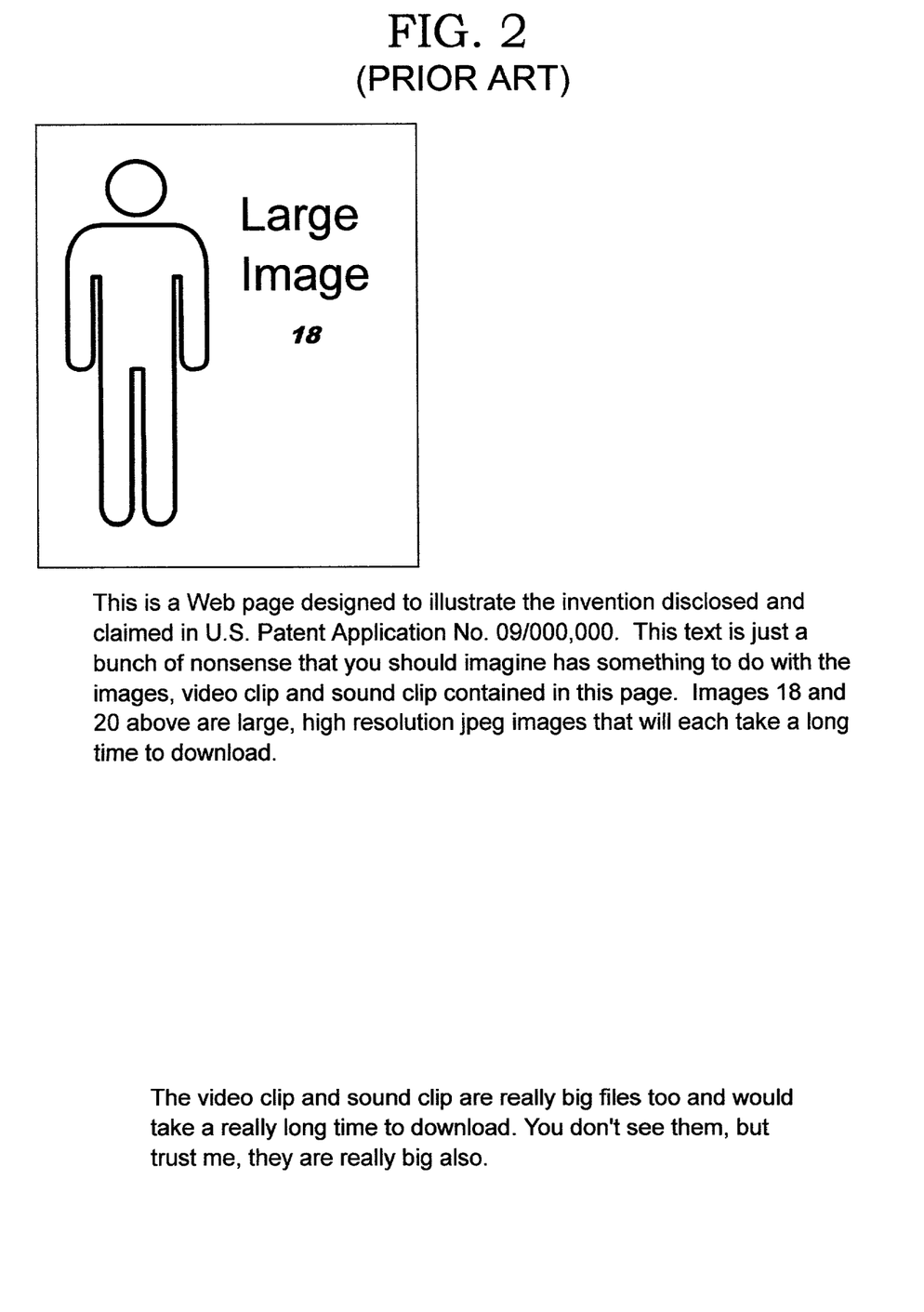
FIG. 2 is a screen capture of the exemplary Web page of FIG. 1 that has been partially rendered in accordance with the prior art.

The present invention provides a method and apparatus by which the designer of the Web page can cause the browser to download the thumbnail images before the other supplemental files even though they appear later in the HTML code of the page. Accordingly, when the Web page of FIGS. 1 and 2 is served to the Web browser by a server enabled in accordance with the method and apparatus of the present invention, the viewer at the client machine would be able to view the screen shown in FIG. 3 almost instantaneously while the larger audio, MPEG and image files are still downloading.

In accordance with the invention, when the server receives a request for a Web page, it retrieves (or constructs) the page and, even before the page is sent to the requesting client, the server parses the page looking for references to supplemental files. In accordance with the invention, each reference to a supplemental file (which typically will take the form of an HTML tag of which one of the attributes is a file path) has associated therewith a sequence code indicating the order in which it should be served to the requesting client relative to all of the other supplemental files referenced in the page. In a preferred embodiment, the sequence code can simply be an additional attribute of the tag associated with the supplemental file. For instance, if the supplemental file is an image file referenced in an <img> HTML tag, then the sequence number would simply be an additional attribute of the <img> tag. For instance, an attribute seq, the value of which is an integer, e.g., seq=1, 2, 3, . . . , could be used as an attribute of any and all HTML tags that refer to supplemental files, such as the <embed>, <object>, <img>, and <applet> tags. Since "seq" has no defined meaning in HTML, when a browser receives a page with such an attribute, it simply will ignore it. However, a server enabled in accordance with the present invention will recognize the "seq=" attribute and read the numeral that appears after the equal sign as a number dictating the order in which that supplemental file should be sent to the requesting Web browser relative to all other tags in the page having an assigned "seq" attribute. The server then builds a queue listing the names of the supplemental in the order dictated by their sequence number and serves those supplemental files in the order dictated by the queue. A default scheme can be readily developed for tags that reference supplemental files but for which a "seq" attribute has not been assigned, if any. For instance, such supplemental files can be served last, after the supplemental files with assigned sequence numbers have been served.

When the Web browser at the client-side receives the full page, it will send out requests for the supplemental files referenced within the HTML code of that page in a particular order dictated by the browser software design, which probably will be in the order in which they are encountered in reading the page from left to right and top to bottom. In most instances, that order will not match the order in which the server has queued the files. Upon receiving the request for the supplemental files, the server detects these request in order to confirm that the page has been received by the client machine and may utilize those requests for other purposes. However, the server software essentially ignores the requests received from the client machine for purposes of serving up the supplemental files.

By queuing up a supplemental files in the order dictated by the designer of the Web page rather than the order dictated by the Web browser running on the client machine, the supplemental files of the Web page can be rendered at the client machine in an order that makes the most sense. No modifications to the Web browser software are necessary. The Web browsers simply ignore the unrecognizable HTML code that dictates the queuing sequence, i.e., the "seq" attribute in the preferred embodiment discussed above.

It would be a simple matter to modify most Web browsers to enable them to receive and properly handle supplemental files regardless of the order in which the Web browser requested them in accordance with the present invention.

Accordingly, the Web page designers may dictate the order in which supplemental files are served to a requesting browser without being constrained by the order in which the relevant tags appear in the code and without any need to modify the software of the Web browsers themselves.

Figure 3:
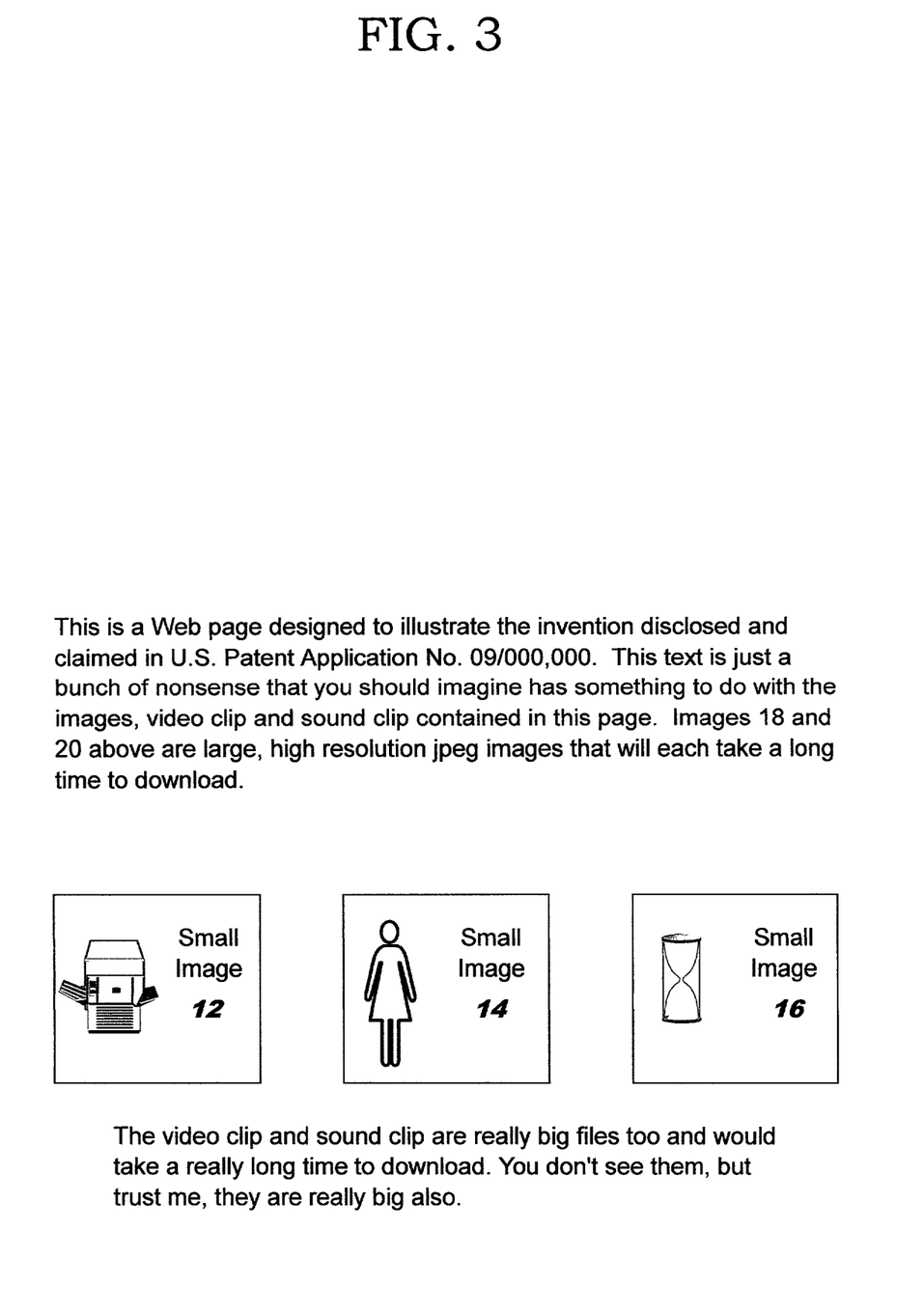
FIG. 3 is a screen capture of the Web page of FIGS. 1 and 2 at a point in time in which it has been partially rendered in accordance with the present invention.

Table 2 is exemplary HTML code for the Web page of FIGS. 1-3 in accordance with the present invention in which sequence number attributes, "seq" have been added to all of the tags that reference supplemental files. It can be seen from Table 2 that the Web page designer has dictated that the thumbnail images 12, 14, and 16 be served first, followed by the image 18, followed by the image 20, followed by the audio file (not shown in FIGS. 1-3) and finally followed by the MPEG file 24.

TABLE 2

```
<!DOCTYPE HTML PUBLIC "-//W3C//DTD HTML 4.0 Transitional//EN">
<html>
<head>
            <title>Web Page Example</title>
</head>
<body>
<div align="center">
```

TABLE 2-continued

```
<img src="image-18.gif" width="240" height="320" border="0" hspace="10" alt="large image 18"
seq="4">
<img src="image-20.gif" width="240" height="320" border="0" hspace="10" alt="large image 20"
seq="5">
<br>
<table border="0" width="480">
    <tr>
        <td>This is a Web page designed to illustrate the invention disclosed and claimed in U.S.
            Patent Application No. 09/000,000. This text is just a bunch of nonsense that you
            should imagine has something to do with the images, video clip and sound clip contained
            in this page. Images 18 and 20 above are large, high resolution jpeg images that will
            each take a long time to download.</td>
    </tr>
</table>
</div>
<br>
<div align="center">
<embed src="video-clip24.mpg" width="320" height="240" controller="true" border="0" cache="false"
seq="7">
</div>
<br>
<div align="center">
<embed src="audio-file.mid" volume="50" height="60" width="144" hidden="true" seq="6">
</div>
<div align="center">
<img src="image-12.gif" width="120" height="120" border="0" hspace="10" alt="small image 12"
seq="1">
<img src="image-14.gif" width="120" height="120" border="0" hspace="10" alt="small image 14"
seq="2">
<img src="image-16.gif" width="120" height="120" border="0" hspace="10" alt="small image 16"
seq="3">
<br>
<table border="0" width="400">
    <tr>
        <td>However, images 12, 14, and 16 are small thumbnail images that will download and, thus,
            be rendered much more quickly. The video clip and sound clip are really big files too
            and would take a really long time to download. You can't see them, but trust me.
            They're really big.</td>
    </tr>
</table>
</div>
</body>
</html>
```

Figure 4:
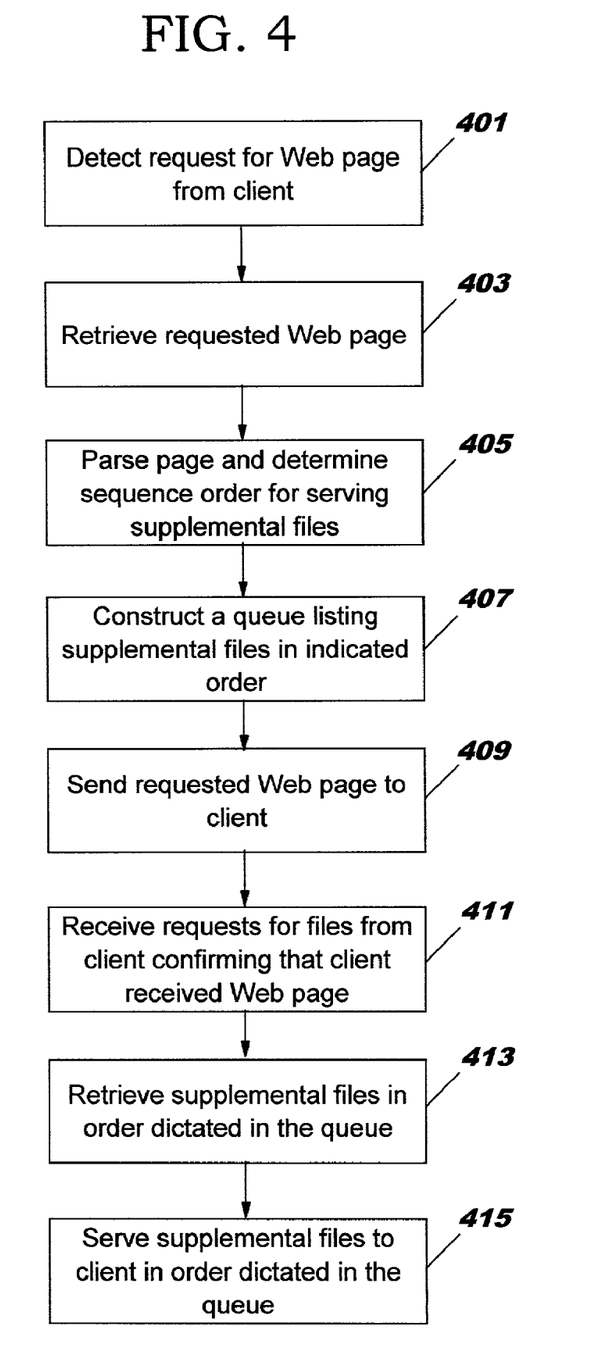
FIG. 4 is a flow diagram in accordance with the present invention.

FIG. 4 is a flow chart illustrating operation at the server-side in accordance with the present invention. In step 401, the server detects a request for a Web page from a client. In step 403, the server retrieves or builds the Web page as the case may be (many Web sites do not store all Web pages, but build them from information contained in a plurality of related tables as requests are received). In step 405, before sending the HTML code comprising the requested Web page to the requesting client, the server parses the page to determine the sequence order for serving supplemental files. In the preferred embodiment described above, it is a matter of detecting the "seq=" attributes within the HTML code of the page.

In step 407, the server constructs and stores a queue listing the supplemental files in the order indicated by the "seq" attributes (or whatever other manner the order is indicated in the HTML code). In step 409, the server sends the Web page code to the requesting client. Between step 409 and the next step 411 in the flowchart, the requesting client presumably receives the complete page and starts sending out requests back to the server for the supplemental files. Accordingly, in step 411, the server receives those requests. The server does not use those requests, however, for queuing up and serving supplemental files. It may, however, use the request to confirm that the page has been received by the client machine (and possibly other purposes unrelated to the present invention). In step 413, the server begins retrieving the supplemental files in the order dictated by the queue. Finally, in step 415, the server serves the supplemental files to the client in the order in which they are retrieved in accordance with the queue.

It should be understood by those skilled in the art that FIG. 4 is a simplified block diagram and that certain of the steps may be looped through, carried out simultaneously, and/or interrupt driven. For instance, with respect to Web pages that contain more than just a few supplemental files, requests from the client machine for supplemental files will be received at different times. Further, the server will simultaneously serve only so many supplemental files simultaneously as there are virtual ports that the browser supports. As each supplemental file is completely received at the client machine, the server can move on to the next supplemental file in the queue and begin serving it to the client machine.

While the invention has been described above in connection with a Web server and a requesting client comprising a desktop computer, it should be understood by those of skill in the related arts that the invention can be employed in connection with any server serving files to any type of client machine, including any type of Web enabled device.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A method of serving a Web page to a requesting client, said Web page comprising code defining said Web page and including a plurality of supplemental files, said method comprising the steps of:
   receiving a request for said Web page;
   obtaining said code defining said Web page responsive to said request;
   parsing said code defining said Web page to detect order data within the code that indicates an order in which said supplemental files are to be served, said order data comprising data other than the order in which said supplemental files appear in said code defining said Web page;
   constructing a queue indicating said order;
   serving said code to said requesting client;
   serving said supplemental files to said client in said order indicated in said queue
   wherein said code defining said Web page comprises HTML code, said references to supplemental files comprise HTML tags, and said order data comprises attributes of said tags.

2. The method of claim 1 wherein said step of obtaining said Web page comprises retrieving said code defining said Web page from a memory.

3. The method of claim 1 wherein said step of obtaining said Web page comprises building said code defining said Web page responsive to said request.

4. The method of claim 1 further comprising the step of:
   receiving and detecting requests from said client machine for said supplemental files; and
   wherein said step of serving said supplemental files is performed after said receiving and detecting step.

5. The method of claim 1 wherein said step of serving said code defining said Web page is performed after said step of constructing said queue.

6. The method of claim 1 wherein said order data attributes are not recognizable by said client machine.

7. A computer readable storage medium containing executable code for controlling a computer for rendering a Web page, said code comprising:
   first code at least partially defining said Web page, said code including a plurality of references to supplemental files containing content of said page; and
   second code indicating an order in which said supplemental files are to be rendered, said second code associated with each of said references and comprising an attribute of a tag associated with said supplemental file.

8. The computer readable storage medium of claim 7 wherein said second code associated with each of said references comprises an attribute of an HTML tag for which another of said tag=s attributes is said reference to a supplemental file.

9. A computer program product embodied on computer readable media readable by a computing device, said product for sewing Web pages to a requesting client machine, wherein at least one of said Web pages contains a plurality of references to supplemental files comprising content of said Web page, said references including order data indicating an order in which said supplemental files are to be served relative to said other supplemental files contained in said page, said product comprising:
   first computer readable program code for receiving requests for said Web pages;
   second computer readable program code for obtaining code defining said requested Web pages responsive to said requests;
   third computer readable program code for parsing said code defining said Web page to detect said order data;
   fourth computer readable program code for constructing a queue in a memory, said queue comprising a list of said supplemental files in said order;
   fifth computer readable program code for serving said code defining said Web page to said requesting client machine; and
   sixth computer readable program code for serving said supplemental files to said requesting client machine in said order of said queue;
   wherein said code defining said Web page comprises HTML code, said references to supplemental files comprise HTML tags, and said order data comprises attributes of said tags.

10. The computer program product of claim 9 wherein said second computer readable program code comprises code for retrieving said code defining said Web page from a storage medium.

11. The computer program product of claim 9 wherein said second computer readable program code comprises code for building said code defining said Web page responsive to receipt of said request for said Web page.

12. The computer program product of claim 9 further comprising:
   seventh computer readable program code for receiving and detecting requests from said client machine for said supplemental files and wherein said sixth computer readable program code operates after said seventh computer readable program code detects said request for at least one of said supplemental files.

13. The computer program product of claim 9 wherein said fifth computer readable program code operates after said fourth computer readable program code constructs said queue.

14. The computer program product of claim 9 wherein said order data attributes are not recognizable by said client machine.

15. A system for serving Web pages to a requesting client machine, at least one of said Web pages containing a plurality of references to supplemental files comprising content of said Web page, said page including order data indicating an order in which said supplemental files are to be served relative to said other supplemental files contained in said page, the system comprising:
   a computer including memory, and a processor, the memory being accessible by the processor and storing computer-readable programming including,
      first computer readable program code for receiving requests for said Web pages;
      second computer readable program code for obtaining code defining said requested Web pages;
      third computer readable program code for parsing said code defining said Web page to detect said order data;
      fourth computer readable program code for constructing a queue in a memory, said queue comprising a list of said supplemental files in said order;
      fifth computer readable program code for serving said code defining said Web page to said requesting client machine; and sixth computer readable program code for serving said supplemental files to said requesting client machine in said order of said queue;

wherein said code defining said Web page comprises HTML code, said references to supplemental files comprises HTML tags, and said order data comprises attributes of said tags.

16. The system of claim 15 wherein said fifth computer readable program code operates after said fourth computer readable program code constructs said queue.

17. The method of claim 15 wherein said order data attributes are not recognizable by said client machine.

* * * * *